Figure 1:
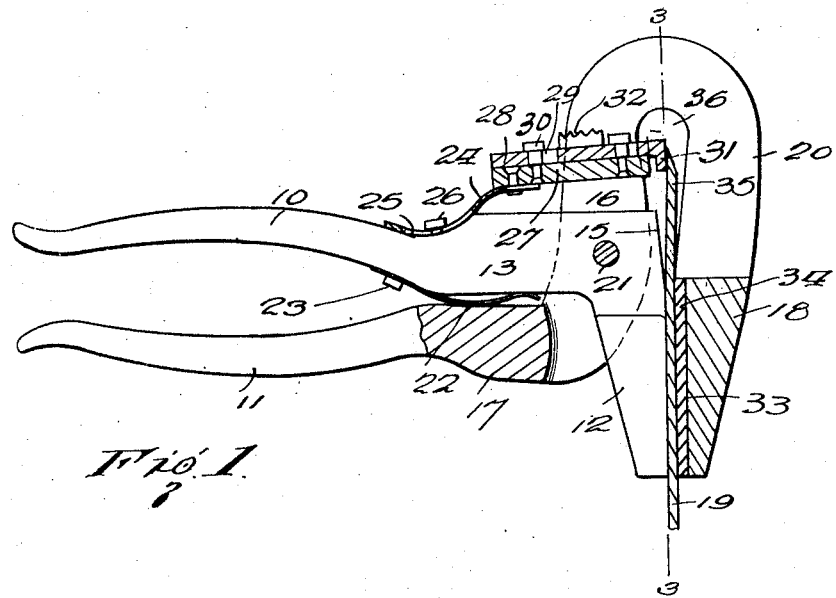

W. S. JACOBSON.
SAW SET.
APPLICATION FILED AUG. 2, 1918.

1,326,735.  Patented Dec. 30, 1919.

William S. Jacobson
Inventor

By Geo. P. Kimmel
Attorney

UNITED STATES PATENT OFFICE.

WILLIAM S. JACOBSON, OF STEEL HEAD, BRITISH COLUMBIA, CANADA.

SAW-SET.

1,326,735.  Specification of Letters Patent.  Patented Dec. 30, 1919.

Application filed August 2, 1918. Serial No. 248,016.

*To all whom it may concern:*

Be it known that I, WILLIAM S. JACOBSON, a citizen of the United States, residing at Steel Head, British Columbia, Canada, have invented certain new and useful Improvements in Saw-Sets, of which the following is a specification.

This invention relates to the class of metal tools and implement making and more particularly to saw setting, the primary purpose of the invention being to provide an improved saw set or set block which will greatly facilitate the accurate setting of a saw and which will accommodate either crosscut or circle saws of varying thicknesses and efficiently and accurately accomplish the setting of the teeth thereof.

A further object of the invention is to provide an improved saw set which will replace the usual set block and provide in part, means for holding a saw blade, a set block and means for gaging the teeth and determining when the same have been properly set.

A still further object of the invention is to provide an improved saw set in the form of a pair of pliers, which will serve to permit accurate setting of the teeth, and which will obviate the possibility of breaking off one of the teeth next to the one being set.

With the above and other objects in view, as will appear as the description proceeds, the invention comprises the various novel features of construction and arrangement of parts which will be more fully described herein and set forth with particularity in the claims appended hereto.

Figure 2:
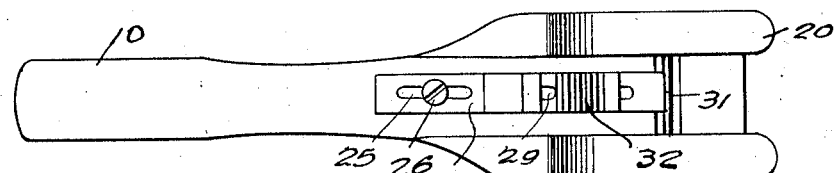
Figure 3:
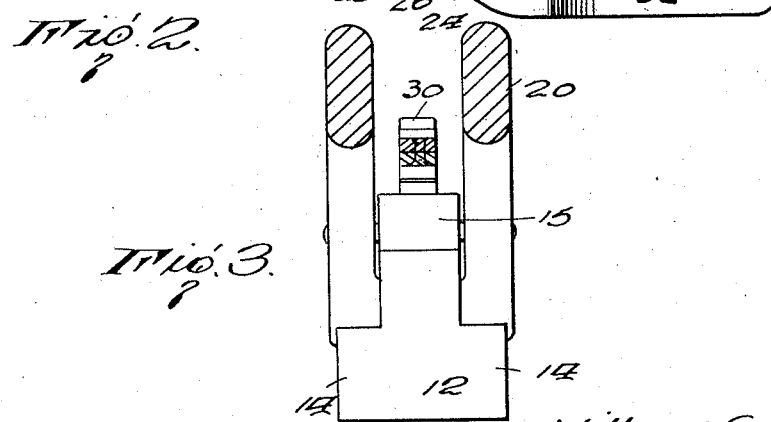

Reference is had to the accompanying drawings forming a part of this application, in which like reference characters indicate the corresponding parts throughout the several views and wherein;

Figure 1 is a vertical sectional view of my improved saw set, partly in elevation,
Fig. 2 is a plan view thereof, and
Fig. 3 is a vertical sectional view taken on the line 3—3 of Fig. 1.

Referring to the drawings in detail, my improved saw set is shown as comprising the handles 10 and 11, the handle 10 having a depending jaw 12 disposed substantially at right angles to the shank portion 13 thereof, said jaw having lateral extensions 14 at the lower portion thereof and having its upper edge rearwardly beveled as shown at 15 to provide a set block or anvil.

The jaw 11 is offset upwardly substantially at right angles, as shown at 16, the same being bifurcated or slotted from the upper face of the shank portion 17 and being curved downwardly, to form the jaw 18 of the same width as the jaw portion of the jaw 12 and coöperating therewith in clamping the saw blade 19, as is particularly shown in Fig. 1 of the drawings. The slotted portion of the jaw 18 is shown at 20 and the respective jaws and handles are pivotally connected at 21.

In order to cause the normal separation of the jaws of the saw set, suitable spring means are provided, the same being shown in the drawings in the form of a leaf spring 22 of arcuate formation and having its inner end anchored as shown at 23 to the bottom surface of the handle 10 adjacent to the shank portion 13 thereof. The free portions of the spring engage the shank portions of the two jaws thus providing an efficient spring action which will normally retain the jaws in an open position but permit the jaws to be moved to a closed position by moving the handles toward each other.

Mounted on the upper portion of the shank 13 is the gaging device, which comprises a spring arm 24, said spring arm being provided with a longitudinal slot 25 receiving the retaining means 26 so that the arm may be adjusted longitudinally of the handle and the shank and over the face of the jaw 12 with respect to the beveled portion 15. The arm 24 has a bottom plate 27 and slidably mounted thereon is a plate 28, this plate having slots 29 engaged by the connection means 30 carried by the bottom plate 27 and permitting movement of the top plate 28 on the bottom plate, so that its depending outer end portion 31 may be moved toward and away from the end of the bottom plate 27 through the instrumentality of a serrated button or operating part 32 arranged upon the top plate 28. The jaw 18 is also provided with a vertical groove 33 receiving a rubber or like elastic jaw face 34 therein, the advantage of this resilient or elastic jaw insert being to prevent slipping of the saw blade 19 owing to the blades varying in thickness. When the set is made to fit a thin saw, perhaps the thinnest, the rubber will always give enough to hold a thick saw firmly.

The device is especially adapted for crosscut saws and circle saws and in its operation, the blade is clamped in a vise or the like and then received between the jaws 12 and 18 until the teeth 35 are disposed adjacent to the beveled portion 15. The instrument is held in the left hand, grasping the handles 10 and 11 so as to close the jaws upon the blade, the latter being received in the cut-out portion 36 formed between the upwardly extending and depending portions of the jaws as shown at 16 and 18. The tooth of the saw disposed adjacent to the set block or anvil produced by the beveled portion 15 in connection with the jaw 12, is then struck with a hammer between the side portions 20 of the jaw 18, said side portions preventing the hammer from striking the next adjacent teeth and breaking the same, as occurs in connection with the ordinary set block. The thumb is engaged with the button of the tooth gage and this gage serves the same purpose as the usual spider employed in connection with a set block. The depending portion 31 of the upper plate 28 is engaged against the teeth while the blade is held in the vise and by moving the button backward and forward, it can be determined when the tooth has been set at the proper angle. When the gage can be pressed downwardly so as to pass the tooth point, without any back and forth movement of the button, then the tooth is correctly set. If the tooth is bent too far, the set need not be removed from the saw, but can be raised thereon and the blade struck with the hammer a little lower down. This will bring the tooth back in place, thereby rendering the device applicable for saws in which the temper of the teeth varies, as is usually the case. This device is more efficient than the ordinary set block owing to the fact that the side portions 20 prevent striking the teeth next to the one being set and thereby obviate breaking off of the teeth. It is also very awkward in connection with the ordinary set block inasmuch as it is awkward to hold the block against the tooth flush, whereas with the present device, when the blade is engaged between the jaws, the tooth is properly positioned with respect to the anvil or set block produced by the beveled portion 15 of the jaw 12. The gage is also handy for manipulation and it is not necessary to go through the many operations which are necessary where a set block and spider are employed.

From the foregoing description taken in connection with the accompanying drawings, the advantages of the construction and of the method of operation of my invention will be readily apparent to those skilled in the art to which the invention appertains.

Having described the principle of operation of the invention, together with the device which I now consider to be the best embodiment thereof, I desire to have it understood that the device shown is merely illustrative, and that such changes may be made when desired, as are within the scope of the device as claimed.

Having thus described my invention, what I claim and desire to secure by Letters Patent of the United States, is:

1. A saw set comprising handles having shank portions, means for movably connecting said handles at the shank portions, one of said handles having a right angularly disposed jaw with a flat face and a beveled portion above the same, the other shank having an upwardly extending and downwardly curved jaw portion coöperating with the first named jaw and adapted to accommodate a saw when the latter is engaged between the jaws, means to cause opening of the jaws, and gaging means carried by the first named shank to determine the proper setting of the saw teeth.

2. A saw set comprising handles having shank portions, means for movably connecting said handles at the shank portions, one of said handles having a right angularly disposed jaw with a flat face and a beveled portion above the same, the other shank having an upwardly extending and downwardly bent jaw portion coöperating with the first named jaw and adapted to accommodate a saw when the latter is engaged between the jaws, said second jaw having spaced side portions adapted to receive a hammer therebetween when setting the teeth against said beveled portion, and a slidable and resiliently supported gage device arranged upon the shank portion of one of the jaws.

3. A saw set comprising handles disposed in crossed relation and having shank parts pivotally connected, one of said handles having a depending jaw provided with lateral extensions at its lower part and a flat engaging face with a beveled upper portion, a spring arm slidable on the other shank, a gage plate slidable on said arm above said beveled portion and having a depending part adapted to engage a saw tooth disposed against the beveled portion to be set, said other jaw having upwardly extending and downwardly curved depending portions spaced apart and providing a vise portion designed to receive a saw blade therebetween when engaged by the jaws, said depending portion having a jaw coöperating with the first named jaw, and means for separating the jaws.

4. A saw set comprising movably connected handles, one of said handles having a saw engaging jaw provided with a flat forward end face having a beveled upper portion, the other handle being extended to provide a neck split longitudinally and bent to extend upwardly and downwardly and terminating in a jaw coöperating with the first mentioned jaw, and a gage carried by the first mentioned handle to determine the proper setting of the saw teeth.

5. A saw set comprising handles having shank extensions pivotally connected, the shank extension of one handle terminating in a jaw having a forward saw engaging face, the shank of the second handle being split longitudinally and bent to position, a jaw carried thereby in operative relation to the first mentioned jaw, and a gage comprising a resilient support connected with the first mentioned handle, a supporting plate connected with the resilient support and positioned above the first mentioned jaw, and an operating plate movably connected with the supporting plate.

In testimony whereof I affix my signature hereto.

WILLIAM S. JACOBSON.